Jan. 20, 1970 C. P. TALLEY 3,491,055
BORON FILAMENT-EPOXY COMPOSITE HIGH STRENGTH STRUCTURES
Filed June 24, 1965 2 Sheets-Sheet 2
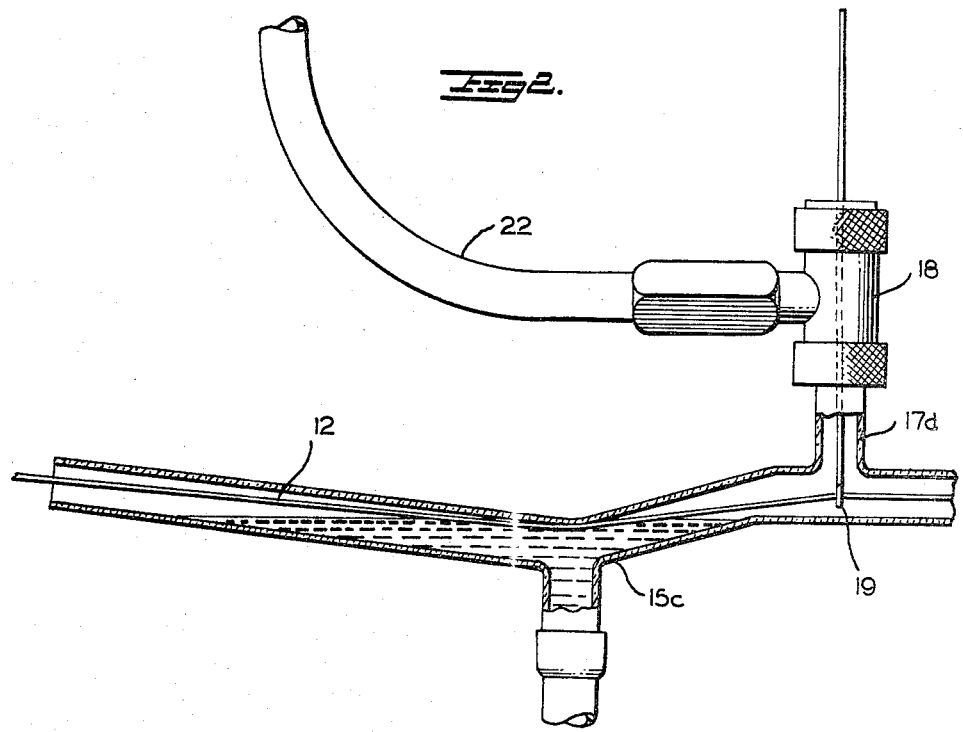
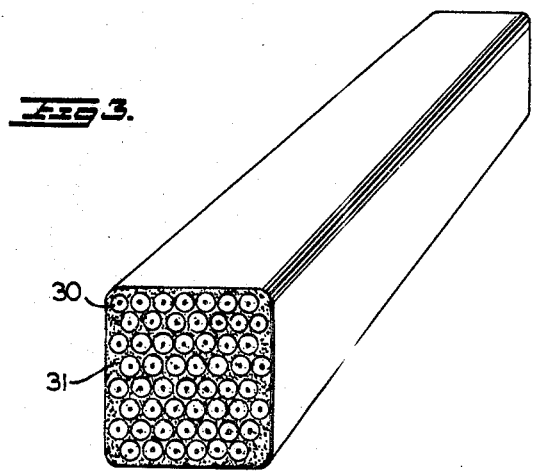
INVENTOR
CLAUDE P. TALLEY
BY *Stowell & Stowell*
ATTORNEYS United States Patent Office
3,491,055
Patented Jan. 20, 1970

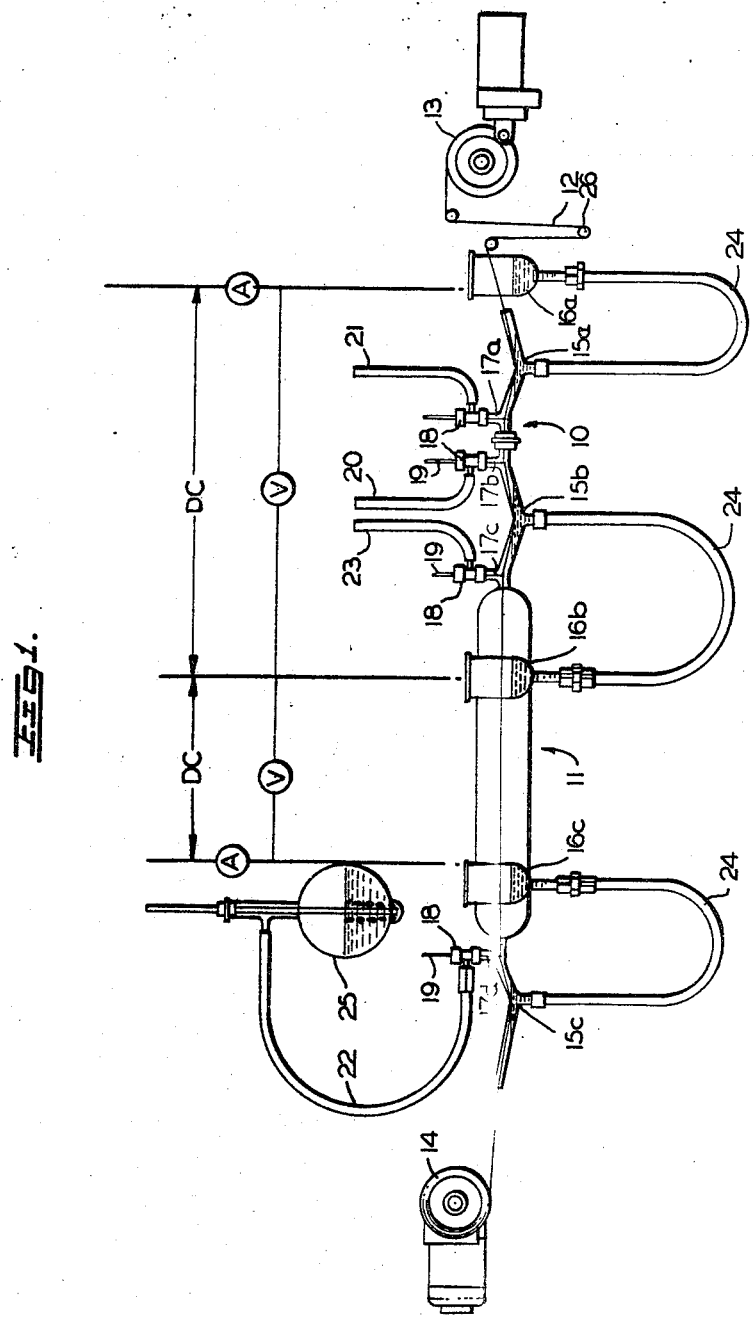

3,491,055
BORON FILAMENT-EPOXY COMPOSITE HIGH
STRENGTH STRUCTURES
Claude P. Talley, Chesterfield County, Va., assignor, by mesne assignments, to Texaco Inc., New York, N.Y., a corporation of Delaware
Continuation-in-part of application Ser. No. 199,903, June 4, 1962. This application June 24, 1965, Ser. No. 466,702
Int. Cl. C08g 51/10; C08k 1/14
U.S. Cl. 260—37
4 Claims This application is a continuation-in-part of my application Ser. No. 199,903, filed June 4, 1962, which is in turn a continuation-in-part of Ser. No. 862,547 filed Dec. 29, 1959, both now abandoned.

This invention relates to high strength refractory filaments and composite structures comprising such filaments, and to methods and apparatus for making the filaments and composite structures, the terms filament and fiber being used herein to denote elongated elements of various cross-sectional shapes including ribbons.

One aspect of the invention relates to methods and apparatus for making high strength filaments of unrestricted length comprising or coated with a refractory or protective material, for example, boron and borides.

Another aspect of the invention relates to composite structure comprising a random or regular array of such high strength filaments embedded in a plastic, elastic, vitreous, metallic, ceramic or cementitious matrix.

Other aspects and fields of utilization of the invention will appear more clearly from the following description of the principles of the invention and illustrative embodiments thereof with particular reference to the accompanying drawings in which FIG. 1 is a semi-diagrammatic elevation of apparatus for the production of high strength refractory filaments of unrestricted lengths;

FIG. 2 is an enlarged fragmentary view of a portion of the apparatus of FIG. 1; and FIG. 3 is an enlarged semi-diagrammatic perspective representation of an illustrative composite structure of the invention.

The method of producing unrestricted lengths of high strength refractory filaments comprises passing an elongated substrate at a substantially constant speed through an ambient gaseous composition containing a vaporizable compound of a refractory element while maintaining the filamentary substrate at a temperature effective to cause the deposition of such refractory element on the substrate. Typically, the gaseous composition may consist of or comprise a thermally decomposable halide or hydride of a refractory element or a mixture of such a halide with hydrogen. For example, the gaseous composition may comprise a mixture of a boron halide, such as boron trichloride, and hydrogen, and at least a portion of the substrate in contact with the gaseous composition is maintained at a temperature in the range from about 1100° K. to somewhat above 1600° K. but below the melting points of boron and the substrate whereby a massive deposit of amorphous or polycrystalline boron is formed on the substrate. Boranes, such at $B_2H_6$, may also be used as the thermally decomposable substance and are particularly suitable for deposition of boron on substrates of lower melting point, such as aluminum. The speed of the substrate through the zone of contact thereof with the gaseous composition is adjusted with respect to the temperature thereof and the rate of deposition of the boron to obtain a deposit of the desired thickness.

Among the substrates which can advantageously be used for the preparation of boron or boride filaments are tungsten, rhenium, tantalum, titanium, molybdenum, iron, copper, nickel nichrome, aluminum, magnesium and graphite. X-ray diffraction data indicate that in the deposition of boron, the boron combines with the substrate substance to form borides. In the case of tungsten substrates, the compounds $WB_2$ or $W_2B_5$ may be formed.

The filaments thus formed may, for some purposes, be subjected to a moving zone melting operation as described in my copending application Ser. No. 179,570 filed Mar. 14, 1962, now Patent No. 3,226,248, for example, to convert the substance of the filament to substantially monocrystalline condition or to otherwise improve the physical properties of the filaments. Localized heating of the extended length filaments produced by the method of the present invention to produce a traveling molten zone is effectively carried out by passing the filament at substantially constant speed by means of feed and take up rollers through an electron gun assembly of the type described in said application Ser. No. 179,570 energized to provide a fixed zone of electron bombardment. Other methods of localized heating of the extended length filaments such as the use of laser beams may also be used.

Suitable apparatus for making continuous or unrestricted lengths of high strength refractory filaments is shown by way of illustration in FIGS. 1 and 2. The illustrated apparatus comprises a preheating chamber generally designated 10 and a deposition chamber generally designated 11. A substrate filament 12 is passed continuously at a substantially uniform rate of travel from power-driven feed spool 13 successively through the preheating chamber and the deposition chamber to power-driven take-up spool 14. The preheating chamber and deposition chamber are sealed from each other and from the surrounding atmosphere by means of Y-shaped mercury seals 15a, 15b, 15c connected by flexible tubes 24 to separate level adjusting reservoirs 16a, 16b, 16c. The mercury seals also serve as contactors for the supply of heating current to the substrate in the preheating and deposition chambers. Tension on the substrate filament is maintained substantially constant by suspending a tensioning weight 26 in a loop of the filament.

T's 17a, 17b, 17c and 17d and associated T-connectors 18 serve as inlets and outlets for gases and vapors into and out of the preheating and deposition chambers and also for the support of adjustable guide loops 19 for the substrate filament as is more clearly shown in FIG 2.

Hydrogen or other purging gas may be supplied to preheating chamber 10 through tube 20 and removed through tube 21 for the purpose of removing adsorbed, absorbed or reacted oxygen from the surface of the substrate filament as its passes through chamber 10. Any lubricants or other surficial impurities are also removed from the filament by evaporation or by reaction with the hydrogen.

Boron halide may be supplied to chamber 11 by passing a carrier gas, such as argon, or a reducing gas, such as hydrogen, through a body of liquid halide in reservoir 25, which is maintained by heat transfer means (not shown) at a suitable predetermined temperature, and passing the gas saturated with halide into the deposition chamber 11 through inlet tube 22. Residual gases and vapors pass out of chamber 11 through tube 23 to recovery or disposal means (not shown). When the thermally decomposable compound is normally gaseous, as for example, $BCl_3$ or $B_2H_6$, the reservoir 25 is not used but the gaseous compound is introduced into the reaction chamber through separate metering means.

Instead of a single deposition chamber 11 as shown in FIG. 1, the apparatus may include a plurality of similar serially connected deposition chambers of the same or of different lengths, each having its individual gas inlets and outlets, and its individual heating current supply, whereby successive deposits of boron may be applied to the substrate filaments.

Refractory or protective mixtures or compounds may also be deposited on the substrate filament. For example, mixtures of volatilizable thermally decomposable substances may be supplied to the deposition chamber to provide simultaneous deposition of two or more substances or different substances may be deposited in succession in successive deposition chambers.

Glass is a suitable material of construction for the outgassing and deposition chambers and for the connections thereto and therebetween including the Y's 15 and the T's 17. The flexible tubing 20, 21, 22, 23 and 24 can be made of polyethylene and T-connectors 18 can be of copper.

The following is a representative example of the operation of the method:

An 0.5 mil tungsten wire is passed through the apparatus at a speed of 2 feet per minute. It is heated to about 1900° F. in a current of hydrogen in the outgassing chamber. In passing through the deposition chamber (about 24 inches in length) it is maintained at about 1900° F. and is contacted with hydrogen gas saturated in vessel 25 with boron tribromide at a temperature of about 77° F. ($BBr_3$ concentration about 8 mole percent). Under these conditions a boron filament about 3 mils in final diameter is obtained and continuous lengths up to 1000 feet of the boron filament having breaking strengths of the order of $4 \times 10^5$ lb./in.$^2$ may be made. Substantial increase in the breaking strength of the filaments can be obtained by etching in boiling nitric acid for a few minutes followed by rinsing in boiling water.

To obtain greater thicknesses of deposition without unduly increasing the length of the filament to be maintained at deposition temperature in a single span, several deposition chambers may be arranged in series. The successive deposition chambers are separated by mercury seals and connected to separate power supplies to permit independent regulation of the heating current in each stage.

Other methods and apparatus for continuous deposition on extended length filaments may also be used.

The continuous deposition apparatus of the invention may be modified to produce multiple filament yarn-like structures by feeding a plurality of filaments in parallel through a deposition chamber or a series of chambers or through a plurality of parallel chambers and combining the filaments leaving the deposition chamber into yarn constructions by methods and devices generally known in the textile arts.

For the purpose of effectively utilizing the strength of the refractory fibers they may be incorporated in a wide variety of solid matrix materials. The matrix materials may include thermoplastic resins such as the polyalkylenes, polystyrene, and polymerized organic vinyl compounds generally, thermosetting resins such as the phenolics and the aminoformaldehyde resins, condensation polymers such as the polyamides, the polyesters, the polyurethanes, the epoxies, the polycarbonates, and the silicone resins. Natural and synthetic elastomers, vitreous compositions, metals, cermets, silicides and inorganic cementitious compositions in general may also be used as matrix materials to impart special properties to the composite structures.

The refractory fibers may be incorporated in the matrix in various ways. For example, all of the fibers in the structure may extend in generally parallel relationship in a rod, beam, tube or sheet structure or the fibers may extend in different directions in adjacent layers. The latter arrangement is particularly effective in providing uniform directional strength properties to sheet structures. The fibers may also be interwoven or interplaited in various patterns, or the fibers, particularly in short lengths, as "staple" fibers, may be dispersed in random directions in the matrix material.

In the illustrative construction shown in FIG. 3, the fibers 30 are arranged in regular parallel relation in matrix 31 to form a beam-like structure. This construction is particularly suitable for rods, tubes and similar shapes and is also useful for carrying out comparative strength tests. For example, tests carried out on structures on the form shown in FIG. 3, in which 3-mil diameter fibers of boron on a 0.5-mil tungsten substrate, made as described in the foregoing example, and embedded in a commercially available epoxy resin (Epon 828 of Shell Chemical Company with Epon curing agent U or Eccobild 127 of Emerson and Cuming Company with Eccobild curing agent 217) at loadings of 65 to 75% of fibers by volume show a very good transfer of the strength properties of the fibers to the composite structures.

In general, the fibers are emplaced in the matrix material while it is in a fluent or plastic condition, and the matrix material is thereafter subjected to hardening conditions which will vary according to the nature of the matrix materials. Such substances as metals, glasses and natural or synthetic thermoplastic substances which soften or melt under the action of heat may be hardened by cooling. Other matrix substances such as thermosetting resins and heat-hardening ceramic compositions may be hardened by heating. Substances such as epoxy resins and many inorganic cements which harden by chemical interaction after mixing can be hardened by standing with or without the application of elevated temperatures to accelerating the hardening reaction.

To provide reinforced glass articles or structures of improved strength and shock resistance, short boron fibers can be distributed throughout the glass while it is in the molten state. The fibers may be in random arrangement or they may be oriented into parallel arrangement by subjecting the glass-fiber mixture to stretching, in rod or sheet form, while the glass is in the plastic condition or by flowing the plastic glass-fiber mixture through suitably shaped orifices. The term "glass" is used in its widest sense to include all types of inorganic vitreous compositions including vitreous borates, borosilicates and phosphates.

The boron fiber in relatively short lengths may also be used to improve the properties of solid rocket propellant grains, without substantial increase in specific weight of the grains. In this use the boron fibers would not only strengthen the grains mechanically but would provide an additional fuel component.

Boron and boron containing filaments made by the method of the invention have an "orange-peel" surface which substantially increases the surficial area of the filaments and improves the adhesion of matrix compositions and the transmission of stresses between the matrix and the filaments embedded therein.

Boron and boron compounds are of particular utility in applications of the structures of the invention requiring high strength in combination with low densities. For certain nuclear applications, high neutron absorption efficiencies can be attained by using boron containing high concentrations of the $B^{10}$ isotope.

Boron filaments or flakes in suitable matrix compositions would be useful as radiation shields. To enhance gamma ray absorption the filaments or flakes could contain a substantial amount of a heavy metal such as tungsten. Tungsten boride filaments made as described in application Ser. No. 179,570 filed Mar. 14, 1962 would be particularly suitable for this purpose. Shielding materials can also be made by incorporating boron filaments in a lead matrix to reinforce the lead and to incorporate the neutron absorbing properties of $B^{10}$. The use of $B^{10}$ containing filaments in an organic plastic matrix would on the one hand greatly improve the strength of the plastic matrix and at the same time the plastic matrix would act as a moderator for fast neutrons to improve their absorption by $B^{10}$. On the other hand $B^{11}$ enriched reinforcing elements can be used to provide high strength in a high neutron flux environment.

Incorporation of boron filaments into light-weight metals such as aluminum and magnesium can greatly increase their strength without adding greatly to their weight. For example, power transmission cables may be made by the continuous extrusion of a boron filament array in an aluminum matrix.

As has been hereinabove suggested, various protective or bond improving coatings may be applied to the boron or boron containing fibers either during or subsequent to the formation of the fibers. For example, a metal coating, such as aluminum, may be vapor coated on the filaments in the last stages of the formation of the filaments. Metals which form eutectics with boron are particularly suitable for this purpose. The coated filament may be heated to eutectic temperature to bond the coating to the filament. Such coated filaments bond readily to a metal matrix in which the filaments are incorporated, particularly when the matrix metal is the same as the coating metal or is a metal which readily alloys with the coating metal. The eutectic coating is also useful in reducing the effect of surface flaws in the boron filaments.

Other coating may be applied to the filaments. When the filaments are to be used as reinforcements for plastic material, the application of a coating of the same or different plastic substance will serve to protect the filaments before they are incorporated into the matrix and to improve the bonding of the filaments with the matrix material.

Particularly suitable for coating the filaments before embedding them in a plastic matrix are polymeric compounds containing nitrogen atoms having an extra pair of electrons which can form a strong bond by coordination with the electron deficient boron atoms thereby strengthening the bond between the boron and an organic plastic matrix. Typical of such polymeric compounds are the polybenzimidazoles which can be prepared by the melt condensation of aromatic tetramines with diphenyl esters of aromatic dicarboxylic acids, for example, the polycondensation reaction product of 3,3′-diaminobenzidine and diphenylisophthalate.

I claim:
1. Composite structure comprising filaments composed predominantly of boron deposited on an elongate heated substrate other than boron from a gaseous composition containing a vaporizable boron compound in a reducing atmosphere, said filaments being embedded in a solid matrix material.
2. The invention defined in claim 1 wherein the solid matrix is an organic plastic.
3. The invention defined in claim 2 wherein the organic plastic comprises a solidified epoxy resin.
4. The invention defined in claim 1 wherein the vaporizable boron compound is a boron halide or a boron hydride.

References Cited
UNITED STATES PATENTS

| | | | |
|---|---|---|---|
| 2,796,411 | 6/1957 | Zirkle et al. | 252—478 |
| 2,839,367 | 6/1958 | Stern et al. | 23—209 |
| 2,859,163 | 11/1958 | Ploetz et al. | 176—93 |
| 2,866,741 | 12/1958 | Hausner | 176—93 |
| 2,915,475 | 12/1959 | Bugosh | 106—39 |
| 2,990,360 | 6/1961 | Porembka | 176—93 |
| 3,000,802 | 9/1961 | Worn et al. | 176—93 |
| 3,088,898 | 5/1963 | Busby et al. | 176—93 |
| 2,967,756 | 1/1961 | Mazzucchelli et al. | 161—170 |
| 3,018,260 | 1/1962 | Creighton | 260—37 |
| 3,037,857 | 6/1962 | Conant | 75—202 |
| 3,142,649 | 7/1964 | Blanco | 252—478 |

OTHER REFERENCES

Laubengayer et al., "Boron" J. Am. Chem. Soc.—vol. 65, October 1943, pages 1924–1931.

Jaffe—"Boron Fibers in Composites"—Society of the Plastics Industry, Inc.—pp. 1–8, Section 8–C, (1965) (especially page 3). Copies in 106–39, 260–37.

HELEN M. McCARTHY, Primary Examiner

U.S. Cl. X.R.

75—200, 202; 106—39, 43, 47, 52, 54, 85, 99; 117—71, 72; 161—169, 170; 252—478; 260—38, 39, 40, 41